2,916,488

SENSITIZING DYES CONTAINING THE SPIRO (4.4) NONANO (1,2d) THIAZOLE NUCLEUS

George de Stevens, New Providence, N.J., assignor to Sperry Rand Corporation, New York, N.Y., a corporation of Delaware No Drawing. Application June 27, 1956
Serial No. 594,120

13 Claims. (Cl. 260—240.4)

This invention relates to cyanine dyes containing a spiro (4.4) nonano (1,2d) thiazole nucleus and to processes for preparing such dyes.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

I have now found that it is possible to prepare cyanine dyes in which one or both of the above mentioned auxochromic nitrogen atoms lie in a spiro (4.4) nonano (1,2d) thiazole nucleus. I have further found that these new cyanine dyes sensitize photographic emulsions strongly and cleanly, i.e., without producing excessive fog or residual dye stain.

It is accordingly an object of my invention to provide new cyanine dyes. A further object is to provide photographic emulsions sensitized with such dyes. Other objects will appear hereinafter.

As starting material for the preparation of my new dyes I employ 2-alkyl spiro (4.4) nonano (1,2d) thiazole, particularly 2-methyl spiro (4.4) nonano (1,2d) thiazole. I first convert these alkyl spiro (4.4) nonano (1,2d) thiazole bases to quaternary salts by reacting the base with esters, such as alkyl halides, alkyl sulfates, or alkyl-p-toluene sulfonates, for example. For purposes of convenience, the quaternary salts useful in practicing this invention can be represented by the following single formula:

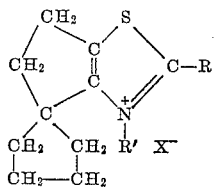

wherein R' represents an alkyl group, e.g., methyl, ethyl, n-propyl, isobutyl, n-butyl, β-hydroxyethyl, β-methoxyethyl, β-ethoxyethyl, β-acetoxyethyl, β-carboxyethyl, carboxymethyl, β-carbomethoxyethyl, β-carbethoxyethyl, allyl, etc. or an aralkyl group, e.g., benzyl, phenylethyl, etc., R represents methyl, ethyl or n-propyl and X⁻ represents an anion, e.g., chloride, bromide, iodide, benzene sulfonate, p-toluene sulfonate, methyl sulfate, ethyl sulfate, thiocyanate, perchlorate, acetate, etc.

To prepare pseudocyanine dyes from such quaternary salts I react the quaternary salts with 2-halogenoquinoline quaternary salts in the presence of an acid binding agent such as sodium ethylate, sodium carbonate, pyridine or a strong organic base (e.g. triethylamine, trimethylamine and N-methyl piperidine). I have found it advantageous to employ a mixture of pyridine with a strong tertiary organic base.

Instead of 2-halogenoquinoline quaternary salts, I can employ 2-alkyl mercapto or 2-aryl mercaptoquinoline quaternary salts to condense with the quaternary salts of 2-alkyl spiro (4.4) nonano (1,2d) thiazole in the presence of an acid binding agent.

Using 2-halogenopyridine quaternary salts instead of 2-halogenoquinoline quaternary salts I can prepare pyrido-cyanine dyes containing a spiro (4.4) nonano (1,2d) thiazole nucleus.

Using 2-alkyl mercapto or 2-aryl mercaptobenzothiazole or naphthothiazole salts I can prepare simple cyanine dyes other than pseudocyanine dyes.

To prepare symmetrical carbocyanine dyes from 2-alkyl spiro (4.4) nonano (1,2d) thiazole quaternary salts, I react the quaternary salts with esters of ortho acids, e.g. ethyl orthoformate, ethyl orthoacetate, ethyl orthopropionate and ethyl orthobenzoate in the presence of pyridine or a mixture of pyridine and triethylamine.

To prepare unsymmetrical carbocyanine dyes from 2-alkyl spiro (4.4) nonano (1,2d) thiazole quaternary salts, I react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethylamine.

To prepare styryl dyes from my new quaternary salts, I condense them with p-dialkyl aminobenzaldehyde in the presence of an alkaline catalyst, e.g., piperidine in absolute ethanol solution.

To prepare merocarbocyanine dyes from 2-alkyl spiro (4.4) nonano (1,2d) thiazole quaternary salts, I condense the quaternary salts with ketomethylene heterocyclic intermediates containing an aryl aminomethylene group in the 5-position in the presence of an acid binding agent, e.g. pyridine plus triethylamine. Examples of such ketomethylene intermediates are 5-acetanilidomethylene-3-ethyl rhodanine, 5-acetanilidomethylene-3-ethyl-1-phenyl-2-thiohydantoin, etc.

To sensitize photographic silver halide emulsions with my new dyes, I disperse the dyes in the emulsions. My invention is particularly directed to the customarily employed gelatino-silver halide emulsions, such as the gelatino-silver bromide, bromiodide, chloride and chlorobromide for example. The methods of incorporating dyes in emulsions are simple and well known to those skilled in the art and are described in various patents and publications, for example, U.S. Patent 2,336,843, patented Dec. 14, 1943.

Felinskii (Comp. rend. acad. Sci. U.S.S.R., 49, 568 (1945); C.A., 40, 6058 (1946)) has reported the synthesis of spiro (4.4) nonan-1-one (I).

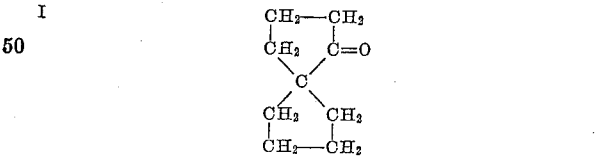

I have found that this spirane can be brominated at position 2 to give 2-bromo spiro (4.4) nonan-1-one (II). I have also found that the enol form of compound II reacts with thioacetamide to yield 2-methyl spiro (4.4) nonano (1,2d) thiazole (III).

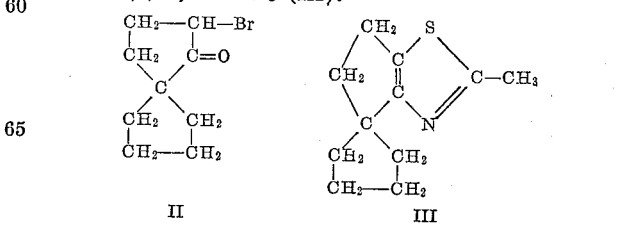

A unique feature of this thiazole is that the two alicyclic-5-membered rings are perpendicular in space to one another.

My invention relates to the preparation of 2-bromo spiro (4.4) nonan-1-one, 2-methyl spiro (4.4) nonano (1,2d) thiazole and its quaternary salts and to the cyanine dyes prepared from these cyclic ammonium salts.

It is well known that cyanine dyes resonate between two extreme forms and that a cyanine dye can be represented by either of the two extreme forms. Thus, the unsymmetrical type of instant dyes can be represented by either of the following formulas.

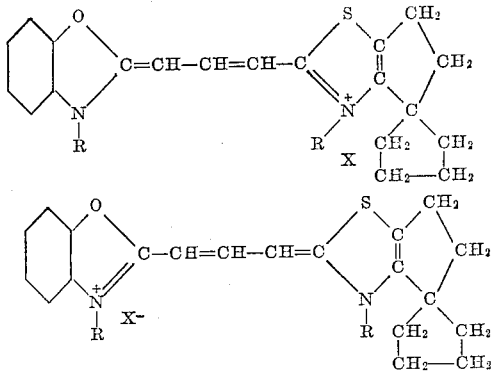

In the above formulae, the heterocyclic ring shown is a benzoxazole nucleus. However, it is to be understood that any nucleus selected from the group consisting of those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl) thiazole, etc.), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5,6-dimethylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g. α-naphthothiazole, β-naphthothiazole, 5-methoxy-β-naphthothiazole, 5-ethoxy-β-naphthothiazole, 8-methoxy-α-napthothiazole, 7-methoxy-α-naphthothiazole, etc.), those of the thianaphtheno-7',6',4,5-thiazole series (e.g. 4'-methoxythianaphtheno-7',6',4,5-thiazole, etc.), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g. α-napthoxazole, β-napthoxazole, etc.), those of the selenazole series (e.g. 4-methyl selenazole, 5-phenylselenazole, etc.), those of the benzoselenazole series (e.g. benzoselenazole, 5-chlorobenzoselenazole, 5-methoxybenzoselenazole, 5-hydroxybenzoselenazole, tetrahydrobenzoselenazole, etc.), those of the naphthoselenazole series (e.g. α-naphthoselenazole, β-naphthoselenazole, etc.), those of the thiazoline series (e.g. thiazoline, 4-methylthiazoline, etc.), those of the 2-quinoline series (e.g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g. quinoline, 6-methoxyquinoline, 7-methylquinoline, 8-methylquinoline, etc.), those of the 1-isoquinoline series (e.g. isoquinoline, 3,4-dihydroisoquinoline, etc.), those of the 3-isoquinoline series (e.g. isoquinoline, etc.), those of the benzimidazole series (e.g. 1,3-diethylbenzimidazole, 1-ethyl-3-phenylbenzimidazole, etc.), those of the 3,3-dialkylindolenine series (e.g. 3,3-dimethylindolenine, 3,3,5-trimethylindolenine, 3,3,7-trimethylindolenine, etc.), the pyridine series (e.g. pyridine, 5-methylpyridine, etc.), etc., is suitable.

The invention is illustrated but not restricted by the following examples:

*Example I.—2-bromo spiro (4.4) nonan-1-one*

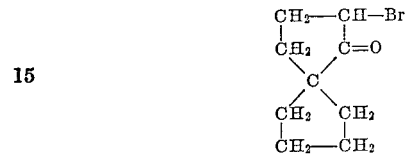

A solution of 27.0 g. (0.15 mole) of bromine in 50 ml. of glacial acetic acid was added dropwise with stirring to a chilled (7°–10° C.) solution of 21.0 g. (0.15 mole) of spiro (4.4)-nonan-1-one in 60 ml. of glacial acetic acid. Pentane (300 ml.) was added and the pentane solution was washed twice with water and twice with sodium bicarbonate solution and dried over $K_2CO_3$. The volume of the pentane solution was reduced to 150 ml. which, after chilling at —50° C., deposited a fine white precipitate. The product was collected at the pump, washed with chilled (—50° C.) pentane and dried over $CaCl_2$. The yield of 2-bromo ketone melting at 39°–40° was 92% of theoretical.

*Example II.—2-methylspiro (4.4) nonano (1,2d) thiazole*

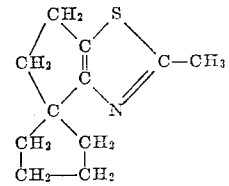

A mixture of 21.8 (0.1 mole) of 2-bromo spiro (4.4) nonan-1-one and 7.5 g. (0.1 mole) of thioacetamide was heated slowly up to 70° whereupon a vigorous reaction followed which was controlled by external cooling. The temperature of the reaction mixture did not rise above 127° and was maintained at 100° for 10 minutes. The brown viscous mass was chilled and extracted with 20% aqueous hydrobromic acid solution. The acid extract, after thorough ether extraction, was made basic with $NH_4OH$ and extracted with ether. The ether extract was then dried over $K_2CO_3$. After evaporation of the ether, the residue was distilled at reduced pressure giving rise to 22% yield of 2-methylspiro (4.4) nonano (1,2d) thiazole, B.P. 90°–95°/0.5 mm.

*Example III.—2-methylspiro (4.4) nonano (1,2d) thiazole methiodide*

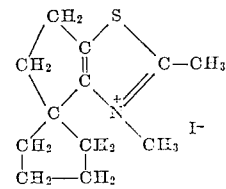

A mixture of 0.5 g. (1 mol.) of 2-methylspiro (4.4) nonano (1,2d) thiazole, 1.0 g. (1 mol.+200% excess) of methyl iodide was refluxed for 24 hours. The chilled solution was triturated three times with 50 ml. portions of ether. The viscous residue was triturated with 3 ml. of acetone and chilled for several hours, whereupon the light yellow powder was collected on a filter, washed with 2 ml. of cold acetone and air dried. The yield of crude product melting at 208°–210° was 40% of theoretical. Recrystallization from acetone (200 ml.

per gram) gave pure quaternary salt melting at 220°–222° with decomposition.

*Analysis.*—Calcd. for $C_{12}H_{18}NSI$: N, 4.18%; S, 9.57%. Found N, 4.06%; S, 9.70%.

*Example IV.*—*2-methylspiro (4.4) nonano (1,2d) thiazole ethiodide*

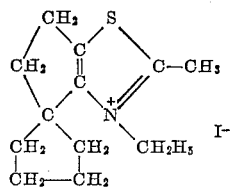

A mixture of 4.0 g. (1 mol.) 2-methylspiro (4.4) nonano (1,2d) thiazole and 7.0 g. (1 mol.+200% excess) of ethyl iodide was refluxed for 18 hours. The chilled solution was triturated well with ether and then cold acetone giving rise to a light yellow powder which was collected on a filter, washed with cold acetone and air dried. The yield of crude quaternary salt, M.P. 178°–180°, was 36% of theoretical.

*Example V.*—*1,1'-diethyl-bis spiro (4.4) nonano (1,2d) thiazolo carbocyanine iodide*

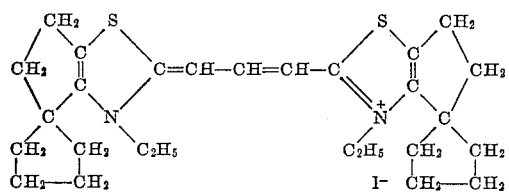

A pyridine solution (15 ml.) containing 1.0 g. (1 mol.) of 2-methylspiro (4.4) nonano (1,2d) thiazole ethiodide, 2.0 g. (1 mol.+300% excess) of diethoxymethyl acetate and 1.0 g. of triethylamine was refluxed 3 hours. After chilling, 200 ml. of dry ether was added to the dye solution and thus triturated. The ether was decanted and the residue was triturated twice more with 200 ml. portions of ether. The residue was then washed with water, followed by trituration and chilling in 3 ml. of acetone. The crude dye was collected on a filter and air dried. Three recrystallizations from acetone (20 ml. per gram) gave a 3% yield of pure dye in the form of minute bluish green crystals melting at 178°–179° with decomposition.

A methanol solution of the dye was reddish blue with an absorption maximum at 580 m$\mu$.

*Example VI.*—*3-ethyl-1'-methyl oxa spiro (4.4) nonano (1,2d) thiazolo carbocyanine iodide*

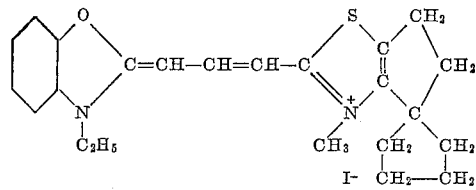

A mixture of 0.2 g. (1 mol) of 2-methylspiro (4.4) nonano (1,2d) thiazole methiodide, 0.27 g. (1 mol) of 2-$\beta$-acetanilido vinyl benzoxazole, 10 ml. of absolute ethyl alcohol and 0.2 g. of triethylamine was refluxed for 30 minutes and then chilled overnight. The precipitated dye was collected at the pump, washed with water then acetone and air dried. Two recrystallizations from acetone (250 ml. per gram) gave a 35% yield of pure dye in the form of bright green needles melting at 190°–191° with decomposition.

The color of a methanol solution of the dye was red with an absorption maximum at 526 m$\mu$.

*Example VII.*—*1,1'-diethyl spiro (4.4) nonano (1,2d) thiazolo-2'-cyanine iodide*

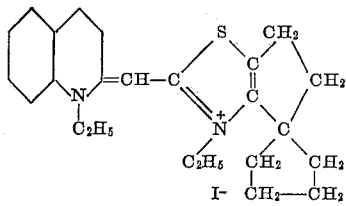

A mixture of 0.7 g. (1 mol) of 2-methylspiro (4.4) nonano (1,2d) thiazole ethiodide, 0.8 g. (1 mol) of iodoquinoline ethiodide, 10 mol. of absolute ethyl alcohol and 0.2 g. of triethylamine was refluxed 45 minutes and chilled overnight. The precipitated dye was collected on a filter, washed well with water, then acetone and air dried. Two recrystallizations from methanol (30 ml. per gram) gave a 30% yield of pure dye in the form of bright red needles melting at 268°–270° with decomposition.

A methanol solution of the dye was orange in color with an absorption maximum at 486 m$\mu$.

*Example VIII.*—*3-ethyl-5-[(1-methylspiro (4.4) nonano (1,2d) 1, (2) thiazolylidene) ethylidene]rhodanine*

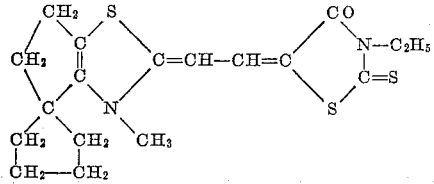

A mixture of 0.1 g. (1 mole) of 2-methylspiro (4.4) nonano (1,2d) thiazole methiodide, 0.8 g. (1 mol) of 5-acetanilido methylene-3-ethyl rhodanine, 10 ml. of absolute ethyl alcohol and 0.2 g. of triethyl amine was refluxed 30 minutes and then chilled overnight. The dye crystals were collected on a filter, washed with water, then methanol and air dried. The crude dye was purified twice by dissolving in 5 ml. of hot pyridine followed by precipitation through the addition of 20 ml. of methanol. A final recrystallization from methanol (1 liter per gram) gave a 40% yield of pure dye in the form of dark red felted needles, melting at 216–218° with decomposition.

A methanol solution of the dye was deep red in color with an absorption maximum at 556 m$\mu$.

*Example IX.*—*2-p-dimethyl aminostyryl spiro- (4.4) nonano (1,2d) thiazole ethiodide*

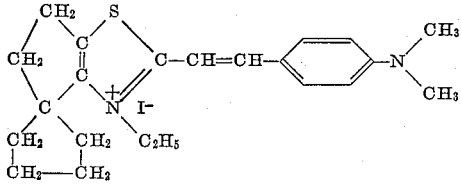

A mixture of 0.35 g. (1 mol) of 2-methylspiro (4.4) nonano (1,2d) thiazole ethiodide, 0.15 g. (1 mol) of p-dimethylamino benzaldehyde, 10 ml. of absolute ethyl alcohol and 1 drop of piperidine was refluxed for 90 minutes and then chilled overnight. The precipitated dye was collected on a filter, washed well with water, then acetone and air dried. Three recrystallizations from methanol (25 ml. per gram) gave a 42% yield of pure dye in the form of bright red crystals melting at 145°–147° with decomposition.

A methanol solution of the dye was orange in color with an absorption maximum at 490 m$\mu$.

The features of novelty which I believe to be characteristic of my invention are set forth with particularity in the following claims. It should be understood, however, that modifications and changes may be made, without departing from the spirit and substance of my invention, as will be apparent to those skilled in the art.

What I claim as my invention and desire to be secured by Letters Patent of the United States is:

1. A dye selected from the group characterized by the following general formula:

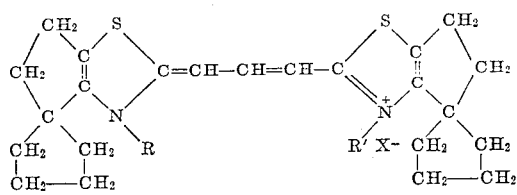

where R and R' respectively represent members selected from the group consisting of alkyl and aralkyl groups, and X⁻ represents an acid radical.

2. 1,1'-diethyl bis (spiro (4.4) nonano (1,2d) thiazolo) carbocyanine iodide having the following structure:

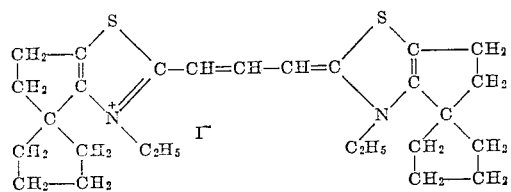

3. A dye selected from the group characterized by the following general formula:

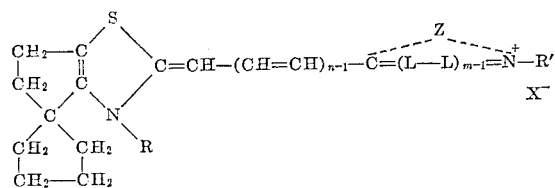

where R and R' respectively represent members selected from the group consisting of alkyl and aralkyl groups, $m$ represents a positive integer from 1 to 2, $n$ represents a positive integer from 1 to 3, L represents a methine group, X represents an acid radical and Z represents the non-metallic atoms necessary to complete a heterocyclic nucleus selected from the group consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the thianaphtheno-7',6',4,5-thiazole series, those of the 2-quinoline series, those of the 4-quinoline series, those of the 1-isoquinoline series, those of the 3-isoquinoline series, those of the benzimidazole series, those of the 3,3-dialkylindolenine series, and those of the pyridine series.

4. 3-ethyl-1'-methyl oxa spiro (4.4) nonano (1,2d) thiazolo carbocyanine iodide having the following structure:

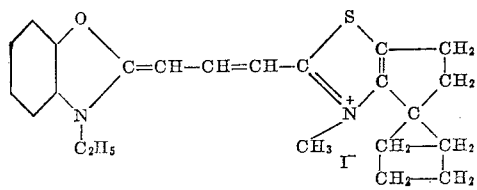

5. 1,1'-diethyl spiro (4.4) nonano (1,2d) thiazolo-2'-cyanine iodide having the following structure:

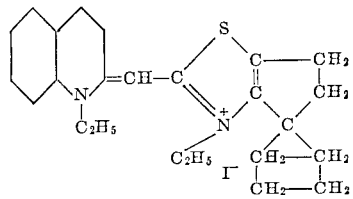

6. A dye selected from the group characterized by the following general formula:

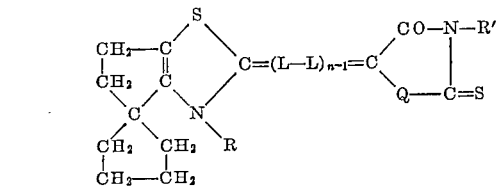

wherein R is a member selected from the group consisting of alkyl and aralkyl groups, R' is a member selected from the group consisting of alkyl, aralkyl, and aryl groups, L is a methine group, $n$ is a positive integer of from 1 to 4 and Q is a member selected from the group consisting of oxygen, sulfur, selenium and -N-R'.

7. 3-ethyl-5-[(1-methylspiro (4.4) nonano (1,2d) 1, (2) thiazolylidene) ethylidene] rhodanine having the structure:

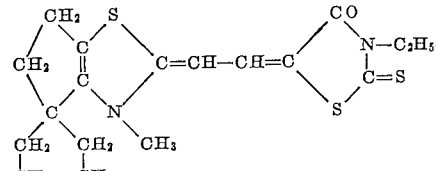

8. A dye selected from the group characterized by the following general formula:

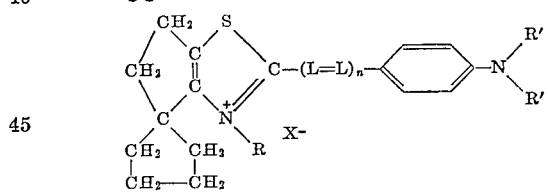

where R and R' represent a member selected from the group consisting of alkyl and aralkyl groups, L represents a methine group, $n$ is a positive integer from one to two, and X⁻ represents an acid radical.

9. 2-p-dimethyl aminostyryl spiro (4.4) nonano (1,2d) thiazole ethiodide having the following structure:

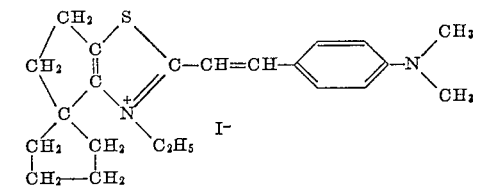

10. A process for preparing symmetrical carbocyanine dyes having the general formula

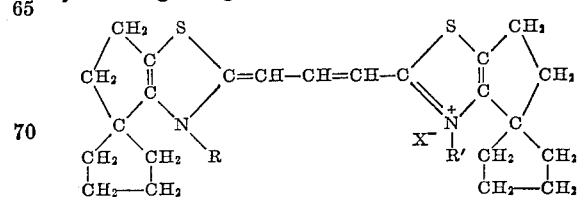

wherein R and R' respectively represent members of the group consisting of alkyl and aralkyl radicals and X⁻ represents an acid radical from a quaternary salt having the general formula

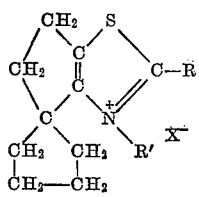

where R represents an alkyl radical $C_NH_{2N+1}$, N is a positive integer selected from the group one to three, both inclusive, and R' represents a member selected from the group consisting of alkyl and aralkyl groups and X⁻ represents an anion, comprising condensing the quaternary salt with an ester of an orthocarboxylic acid in an alkaline medium containing at least one constituent selected from the group consisting of pyridine and a mixture of pyridine and triethylamine.

11. A process for preparing unsymmetrical cyanine dyes having the general formula

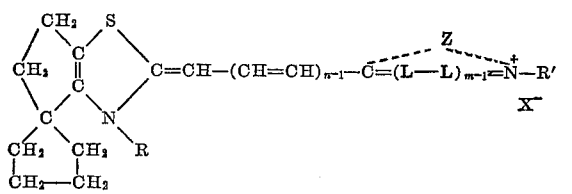

where R and R' respectively represent members selected from the group consisting of alkyl and aralkyl groups, m represents a positive integer from 1 to 2, n represents a positive integer from 1 to 3, L represents a methine group, X represents an acid radical and Z represents the non-metallic atoms necessary to complete a heterocyclic nucleus selected from the group consisting of those of the thiazole series, those of the benzothiazole series, those of the naphthothiazole series, those of the oxazole series, those of the benzoxazole series, those of the napthoxazole series, those of the selenazole series, those of the benzoselenazole series, those of the naphthoselenazole series, those of the thiazoline series, those of the thianaphtheno-7',6',4,5-thiazole series, those of the 2-quinoline series, those of the 4-quinoline series, those of the 1-isoquinoline series, those of the 3-isoquinoline series, those of the benzimidazole series, those of the 3,3-dialkylindolenine series, and those of the pyridine series, from the quaternary salt having the general formula

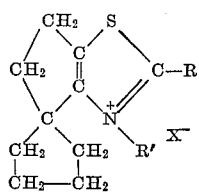

wherein R represents an alkyl radical $C_NH_{2N+1}$, N is a positive integer from 1 to 3, R' represents a member selected from the group consisting of alkyl and aralkyl groups and X⁻ represents an acid radical comprising condensing said quaternary salt with a heterocyclic ammonium quaternary salt having a reactive constituent selected from the group consisting of aryl aminovinyl groups, aryl aminobutadienyl groups, halogen atoms and thioether groups in a position selected from the alpha and gamma positions, in the presence of an alkaline condensing agent.

12. A process for preparing merocarbocyanine dyes containing the spiro (4.4) nonano (1,2d) thiazole nucleus and having the general formula

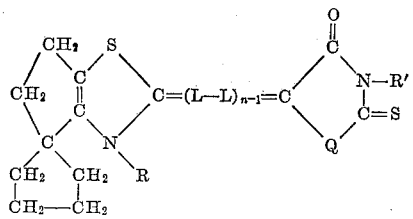

wherein R' represents a member selected from the group consisting of alkyl, aralkyl and aryl groups, R represents a member selected from the group consisting of alkyl and aryl groups, L is a methine group, n is a positive integer of from 1 to 4 and Q is a member selected from the group consisting of oxygen, sulfur, selenium and =N—R' comprising condensing in an alkaline medium a quaternary salt having the general formula

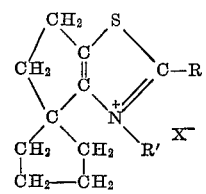

wherein R represents an alkyl radical $C_NH_{2N+1}$, N is a positive integer selected from the group, one to three, both inclusive, and R' represents a member selected from the group consisting of alkyl and aralkyl groups and X⁻ represents an anion with a ketomethylene heterocyclic compound having a reactive arylaminomethylene group in the 5 position in an alkaline medium.

13. A process for preparing styryl dyes containing the spiro (4.4) nonano (1,2d) thiazole nucleus and having the formula

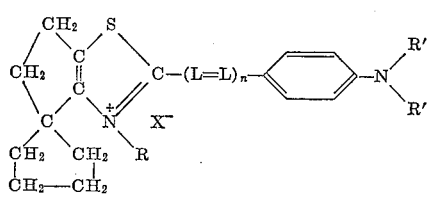

where R and R' respectively represent a member selected from the group consisting of alkyl and aralkyl groups, L represents a methine group, n represents a positive integer from 1 to 2 and X⁻ represents an acid radical comprising condensing a quaternary salt having the formula

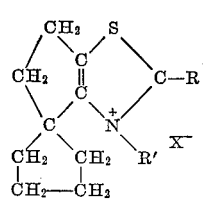

where R represents an alkyl radical $C_NH_{2N+1}$, N is a positive integer selected from the group, one to three, both inclusive, and R' represents a member selected from the group consisting of alkyl and aralkyl groups and X⁻ represents an anion with p-dialkyl aminobenzaldehyde in the presence of an alkaline catalyst.

References Cited in the file of this patent

UNITED STATES PATENTS

| | | |
|---|---|---|
| 1,970,656 | Johnson | Aug. 21, 1934 |
| 2,066,966 | Dieterle | Jan. 5, 1937 |
| 2,112,140 | Brooker et al. | Mar. 22, 1938 |
| 2,179,990 | Beilenson | Nov. 14, 1939 |
| 2,336,463 | Brooker et al. | Dec. 14, 1943 |
| 2,336,843 | Brooker et al. | Dec. 14, 1943 |
| 2,581,932 | Smith | Jan. 8, 1952 |
| 2,704,714 | Carrol et al. | Mar. 22, 1955 |

OTHER REFERENCES

Chemical Abstracts, 16, 3101. (Copy in S.L.) Abstract of Brit. Med. Journal, 1922I, 514–5.

Chemical Abstracts, 19, 530. (Copy in S.L.) Abstract of Pro. Roy. Soc., London, 96B, 317–33, 1924.

Clerc: "Photography Theory and Practice, 3rd ed., page 151, Pitman Pub. Corp., N.Y., 1942. (Copy in Div. 60.)